United States Patent Office 3,845,051
Patented Oct. 29, 1974

---

3,845,051
α,ω-DI-s-TRIAZINYL PERFLUOROPOLYOXA-ALKANES
Joseph La Mar Zollinger, Maplewood, Minn., assignor to Minnesota Mining and Manufacturing Company, St. Paul, Minn.
No Drawing. Continuation-in-part of application Ser. No. 70,540, Sept. 8, 1970. This application Jan. 21, 1971, Ser. No. 108,623
Int. Cl. C07d 55/50
U.S. Cl. 260—248 CS          8 Claims

ABSTRACT OF THE DISCLOSURE

α,ω-Di-s-triazinyl n-perfluoropolyoxaalkanes, useful as hydraulic fluids or lubricants, of the formula:

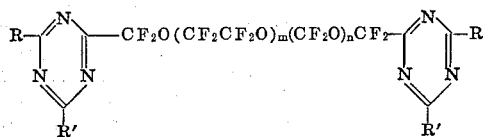

where R and R' are organic radicals, prepared, for example, by condensation between precursor amidine and perfluoropoly-(oxyalkylene) dinitriles and cyclization of the resulting di-imidoylamidine.

---

This application is a continuation-in-part of the copending application Ser. No. 70,540, filed Sept. 8, 1970.

This invention relates to α,ω-di-s-triazinyl perfluoropolyoxaalkanes and their preparation.

The advent of new higher performance aerospace systems has generated a demand for hydraulic fluids and lubricants which are capable of withstanding the increasing thermal and oxidative stress conditions without undergoing appreciable degradation (see Chemistry and Industry, Feb. 7, 1970, pages 178–179). This stability must be accompanied by adequate low temperature fluid properties and satisfactory lubricating characteristics. One or more of these important properties are lacking in currently available materials such as super-refined mineral oils, diesters, and polyphenyethers. Certain fluorocarbon materials, including those containing an s-triazine nucleus, have oxidative and thermal stability and have also been considered to meet such demand, but they generally exhibit relatively high temperature coefficients of viscosity—that is, they exhibit a relatively large change in viscosity with a change in temperature—as well as having relatively high pour points and high viscosities at low temperatures, i.e. below 0° F.

In connection with fluorocarbon compounds related to those of the instant invention, reference is made to U.S. Pats. 3,086,946, 3,453,275, German Pat. 1,953,857, and J. Org. Chem. 32, 603 (1967).

The novel α,ω-di-s-triazinyl n-perfluoropolyoxaalkanes of this invention are normally liquid compounds and can be characterized by the general formula

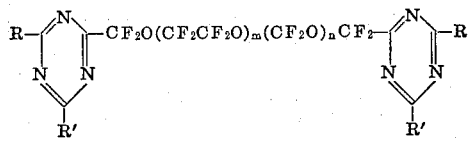

where m and n are integers designating randomly distributed perfluoroethyleneoxy and perfluoromethyleneoxy repeating subunits, respectively, the ratio m/n being 0.01/1 to 5/1, usually 0.2/1 to 5/1, said linkage connecting the two triazine nuclei having at least 5 ether oxygen atoms and a number average molecular weight of about 400 to about 40,000, or higher.

In said formula I, R and R' are each monovalent organic radicals bonded to the triazine nucleus by a carbon-carbon bond. Representative R and R' radicals include alkyl (e.g. alkyl having 1 to 8 carbon atoms), and aryl (e.g. phenyl), cycloalkyl and heterocyclic with 5 or 6 ring atoms, e.g. cyclohexyl and tetrahydrofuranyl, and combinations thereof, e.g. alkaryl, aralkyl, and the like, such radicals preferably having 1 to 18 carbon atoms.

Said radicals R and R' can be monovalent saturated fluoroaliphatic radicals ($R_f$ and $R'_f$), each of which is bonded to a carbon of the triazine nucleus. Where said fluoroaliphatic radical contains a plurality of carbon atoms in a skeletal chain, such chain may be branched or cyclic but preferably is a straight chain. Said skeletal chain of carbon atoms can be interrupted by divalent hetero atoms or radicals, such as divalent oxygen or sulfur, or trivalent nitrogen atoms, each of which is bonded only to carbon atoms, but preferably where such hetero moieties are present, such skeletal chain does not contain more than one said hetero moiety for every two carbon atoms. An occasional carbon-bonded hydrogen atom, bromine atom, or chlorine atom may be present, though they adversely affect thermal and/or oxidative stability of the compound; where present, however, they preferably are present not more than once for every two carbon atoms. Thus, for high thermal and oxidative stability, the non-skeletal valence bonds are preferably carbon-to-fluorine bonds, that is, $R_f$ and $R'_f$ are preferably perfluorinated. The total number of carbon atoms in $R_f$ and $R'_f$ can vary and be, for example, up to 50, but preferably is from 1 to 18, more preferably 1 to 8. Where $R_f$ and $R'_f$ is or contains a cyclic structure, such structure preferably has 5 or 6 ring members, 1 or 2 of which can be said hetero atoms, e.g. oxygen, sulfur, and/or nitrogen. The $R_f$ and $R'_f$ are also free of ethylenic or other carbon-to-carbon unsaturation, that is, they are saturated aliphatic, cycloaliphatic, or heterocyclic radicals. Examples of $R_f$ and $R'_f$ radicals are fluorinated alkyl, e.g. $CF_3$—, alkoxyalkyl, e.g. $CF_3OCF_2$—, and alkoxymono(or poly) alkyleneoxyalkyl, e.g., $CF_3OCF_2OCF_2$, said radicals being preferably perfluorinated, straight-chain aliphatic radicals consisting only of carbon and fluorine atoms.

$R'_f$ can be the same as $R_f$ but preferably $R'_f$ is a perfluoroalkyl or perfluoroalkoxyalkyl radical having 1 to 8 carbon atoms and derived from a perfluoroalkanoic or perfluoroalkoxyalkanoic acid.

The various R, R', $R_f$, and $R'_f$ radicals can be all the same or can be different.

The compounds of formula I have a carbon-to-oxygen atom ratio of less than 5 to 1, preferably less than 3 to 1. The number average molecular weight, $\overline{M}_n$, of said compounds will be in the range of 600 to 20,000 or higher e.g. 40,000, preferably 800 to 15,000.

The di-triazinyl perfluoropolyoxaalkanes of formula I, in addition to being chemically inert and having desirably high thermal and oxidative stability and relatively low flammability, have extremely low temperature coefficients of viscosity, that is, they exhibit little change in viscosity with change in temperature, and have a broad liquid range, that is, a low pour point combined with a high boiling point. These properties make the di-triazinyl perfluoropolyoxaalkanes particularly useful as lubricants, hydraulic fluids, and heat transfer fluids under severe service conditions, such as those encountered by supersonic aircraft. They also are useful as dielectric fluids and can be used in precision instruments such as gyroscopes and dashpots.

As mentioned above, the di-triazinyl perfluoropolyoxaalkanes (I) exhibit very low changes in viscosity with temperature. This property can be best measured by following Standard 533–43 of the American Petroleum Institute, frequently called the "ASTM slope." This slope is the tangent of the acute angle of the viscosity-temperature plot of the liquid under test on the ASTM Standard Chart D 341–43. The smaller the ASTM slope, the flatter the plotted curve and the lower the change in viscosity with temperature. Said Chemistry and Industry article, supra, gives viscosity-temperature values for a theoretical "ideal" lubricant. The ASTM slope determined from those values is 0.5. The ASTM slopes of some of the di-triazinyl perfluoropolyoxaalkanes of this invention approach 0.5 and others are lower than 0.5. These desirably low ASTM slopes for these compounds are coupled with high boiling points (i.e., low volatility), low pour points, and lower viscosities at given temperatures.

The di-triazinyl perfluoropolyoxaalkanes of formula I can be prepared, for example, by the condensation of an amidine (II) with a novel perfluoropoly(oxyalkylene) dinitrile (III) to form an intermediate novel di-imidoylamidine (IV), followed by cyclodehydration of the latter with an anhydride (V), as illustrated by the following series of equations where $R_{fo}$ is

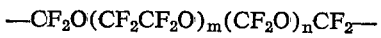

as defined above:

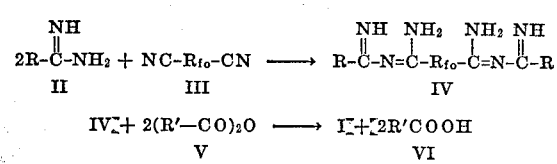

where the amidine (II) is a fluorinated amidine, i.e., $R_fC(NH)NH_2$, it can be prepared from a corresponding mononitrile, $R_fCN$, by treating the latter with an excess of ammonia and removing the unreacted ammonia, said mononitriles and said conversion procedures being known (e.g., see U.S. Pats. 2,567,001, 2,676,985, 3,696,002, and 3,470,176). Where the amidine (II) is a non-fluorinated amidine, or is otherwise free of strong electron-withdrawing moieties, it can be prepared from the precursor mononitrile (such as those disclosed in U.S. Pat. 3,095,414) by such known procedures as disclosed in Organic Synthesis, Vol. I, p. 5 (1941), John Wiley & Sons, N.Y. and J. of Chem. Soc. (1946), p. 147. The di-nitrile (III) can be prepared by ammonolysis of the ester or acyl halide precursors (which are disclosed in Italian Pat. 817,809) and dehydration of the resulting carbonamide, using known procedures. The condensation of the dinitrile (III) with the amidine (II) can be carried out by following the known procedure for making imidoylamidines (e.g. see U.S. Pat. 3,489,727), for example in an inert solvent at low temperature, e.g. —40° C. to +25° C. The resulting di-imidoylamidine (IV) can then be cyclodehydrated, for example at 0 to 30° C., with the anhydride (V) (e.g. see Rubber Chem. and Tech. 39 1,175 (1966)). Suitable anhydrides for this purpose representatively include acetic, benzoic, 4,4,4-trifluorobutyric, and acrylic anhydrides. The di-triazinyl perfluoropolyoxaalkane product (I) can be recovered from the resulting reaction product mixture by distillation or by any other suitable recovery technique. For example, the product can be recovered by distillation after first distilling off the solvent and by the by-product acid, $R'CO_2H$, and any other low boiling by-products which may result from incomplete condensation. Ring closure of the di-imidoylamidine can also be accomplished with acyl halides, nitriles, esters, or the like.

Objects and advantages of this invention are illustrated in the following examples, but the various materials and amounts thereof recited in these examples, as well as various conditions and other details, should not be construed to unduly limit this invention.

EXAMPLE 1

Anhydrous gaseous ammonia was bubbled into 25 g. of

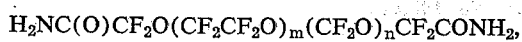

($\overline{M}_n=1,400$, $m/n=1.55$) until all the ester groups were converted into amide groups. The liquid diamide, $n_D^{24}$ 1.3138, weighed 24.2 g. and had a carbonyl infrared absorption band at 5.75 microns.

In a 500 ml. round-bottom glass flask was placed 22.8 g. (0.016 mole) of the liquid dicarbonamide, prepared above, viz.

$H_2NC(O)CF_2O(CF_2CF_2O)_m(CF_2O)_nCF_2CONH_2$, 140 g. of sand, and 57 g. (0.40 mole) of $P_2O_5$. The mixture was shaken vigorously until it became nearly free-flowing, then heated in a sand bath under a vacuum of 50 mm. of mercury. The dinitrile product began distilling (through a short path distilling head) when the pot temperature reached 195° C. The pressure was reduced to 20 mm. at a pot temperature of 227° C. and to 2.5 mm. at a pot temperature of 248° C. Total heating time was about 3 hrs. The yield of colorless liquid was 19.2 g., $n_D^{24}=1.2894$. Infrared absorption of the group —CN is 4.39 microns. Fluorine nuclear magnetic resonance peaks (using $CFCl_3$ as internal standard) for terminal $CF_2$ groups are at 58.6 and 60.0 $\phi^*$. The data for said nitrile product are consistent with the structure $NCCF_2O(CF_2CF_2O)_m(CF_2O)_nCF_2CN$.

To a 100 ml. three-neck flask fitted with a dry ice condenser and containing about 50 ml. anhydrous ether, was transferred (by volatilization) about 4 g. (0.24 mole) of anhydrous ammonia. To this cold (—30° C.) solution was added 16.6 g. (0.012 mole) of the above-prepared dinitrile dissolved in 20 ml. of 1,1,2-trichlorotrifluoroethane (Freon 113) over a 20-min. period with stirring. Stirring was continued an additional 30 min. and the solution allowed to warm to room temperature. Infrared analysis of the solution showed the absence of nitrile and the presence of peaks consistent for amidine. The di-amidine product is a viscous, colorless liquid having the formula

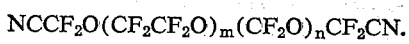

A solution of 6.8 g. (0.026 mole) of perfluoro(ethoxypropionitrile) in 20 ml. of Freon 113 was added over a 20-min. period with stirring to all of the above-prepared di-amidine (ca. 0.012 mole) dissolved in 50 ml. of the same solvent. Stirring was continued for 28 hrs. The imidoyl amidine product gave a characteristic blue complex with cupric acetate and had the formula

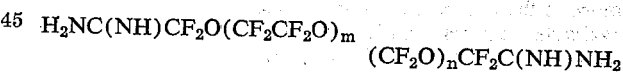

To the above-prepared imidoyl amidine product (ca. 0.012 mole) was added with stirring over a 15-min. period 32.5 g. (0.060 mole, 20 ml.) of perfluoroethoxypropionic anhydride. The reaction was exothermic (ca. 50° C.). The gelatinous material which formed initially dissolved on stirring for 15 min. Infrared analysis showed evidence that acylation and cyclization had taken place to yield the desired triazine product. Excess anhydride and acid by-product were removed under reduced pressure at the aspirator, and the residual liquid distilled through a short path (8 cm.) column at low pressure. The fraction (17.4 g.) boiling at 145 to 300° C. at 0.05 to 0.15 mm. was collected as a pale yellow liquid, and characterized by infrared and N.M.R. analyses as

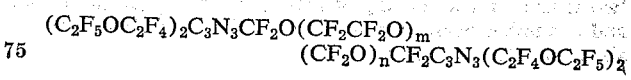

($\overline{M}_n$=3150, $n_D^{24}$=1.3085, m/n=1.55). It had viscosities of 6.6 cs. at 100° C., and 31 cs. at 38° C., and its ASTM slope was 0.62.

EXAMPLE 2

In a dry 250 ml. flask was placed 100 ml. of Freon 113 and 45.4 g. of a dinitrile prepared as described in Example 1 and having the same formula except $\overline{M}_n$=1800 and m/n=1.4. To this stirred solution was added, during a one hour period, 10.8 g. of trifluoroacetamidine (prepared from trifluoroacetonitrile and excess ammonia) as a solution in 50 ml. of dichloromethane. Stirring was continued overnight. Removal of solvents under reduced pressure gave 45.6 g. of the desired imidoylamidine product:

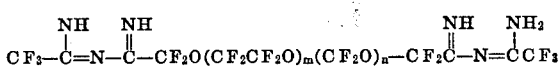

A solution of 20 g. of said imidoylamidine, dissolved in 25 ml. of Freon 113, was added dropwise with stirring to 15.0 g. of acrylic acid anhydride cooled to —5° C. Heating for two days at 40° C. resulted in formation of the di-triazine product. Excess anhydride and by-product acrylic acid were removed by washing with aqueous potassium bicarbonate.

After washing the organic layer with dilute hydrochloric acid and removal of solvent, the crude di-triazine product was obtained. A carbonyl impurity was removed by means of column chromatography on silica gel in Freon 113 solution. The liquid di-triazine product had the following N.M.R. absorption peaks: proton: 2.5–4τ due to —CH=CH$_2$; fluorine: 74.7 and 76.7φ* due to terminal CF$_2$; 72.4φ* due to the —CF$_3$ group. Infrared analysis showed a strong band at 6.37 microns due to the triazine ring. These data are consistent with the following structure for the di-triazine

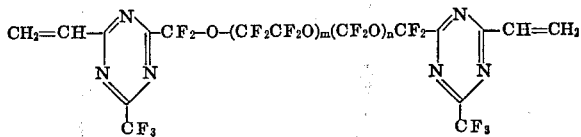

EXAMPLE 3

The procedure of Example 2 was followed, except that the dinitrile used (45.6 g.) had a $\overline{M}_n$ of 2100 and an m/n of 0.6 and the anhydride used (23.9 g.) was trifluoroacetic anhydride. The resulting crude di-triazine product (45.9 g.) after removal of excess anhydride and acid under vacuum was purified by column chromatography on silica gel using Freon 113 as eluting solvent. In this manner, 22 g. of crude di-triazine (containing carbonyl impurities, as indicated by infrared analysis) yielded 12.9 g. of a cloudy product, which infrared analysis indicated was pure. Extraction of a solution of the cloudy product in a c-C$_8$F$_{16}$O/C$_8$F$_{18}$ mixture with tetrahydrofuran afforded, after removal of solvent, a clear di-triazine liquid product having the structure:

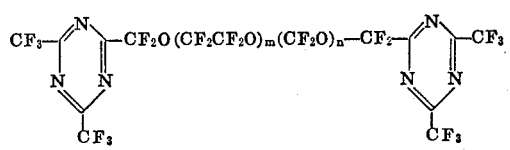

The di-triazine liquid product was heated at 250° C. at a pressure of mm. Hg to remove the more volatile sub-stituents. The residual di-triazine product had the following properties:

Mol. Wt. ($\overline{M}_n$): 4070
Pour Point (ASTM D 97–66): —62.5° C.
Analysis: Found: C, 20.4; F, 61.0; N, 2.1; O, 16.5.
Infrared Analysis: Peak at 6.4 microns
Viscosity

| | Centistokes |
|---|---|
| 0° C. | 442.4 |
| 38° C. | 111.5 |
| 55° C. | 70.6 |
| 68° C. | 52.3 |
| 99° C. | 29.9 |
| 232° C. | 6.72 |

ASTM Slope (between 38 and 99° C.): 0.36

Thermal stability: a 1 g. sample of di-triazine was heated a total of 1344 hours at 232° C. in an open glass tube with no significant change in the infrared spectrum and only a 11.8% loss in weight. The sample remained clear and colorless.

Volatility: Thermogravimetric analysis (20° C. rise per min.) gave these results:

| Wt. Loss percent: | Temp., ° C. |
|---|---|
| 25 | 381 |
| 50 | 458 |
| 75 | 498 |
| 100 | 534 |

The above properties of flat viscosity temperature curve and thermal stability, combined with the exceptional fluidity at low temperatures, make them generally useful as lubricants, hydraulic fluids, or viscosity index improvers for perhalogenated lubricants.

Various modifications and alterations of this invention will become apparent to those skilled in the art without departing from the scope and spirit of this invention, and it should be understood that this invention is not to be unduly limited to the illustrative embodiment set forth herein.

What is claimed is:
1. Normally liquid compounds of the formula

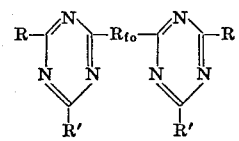

where R$_{fo}$ is a linkage of the formula

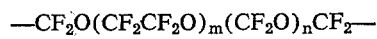

said linkage having at least 5 ether oxygen atoms and a number average molecular weight of about 400 to 40,000, m and n are integers designating randomly distributed perfluoroethyleneoxy and perfluoromethyleneoxy repeating units, respectively, the ratio m/n being 0.01/1 to 5/1, and R and R' are monovalent organic radicals of 1 to 18 carbon atoms selected from the group consisting of alkyl, cycloalkyl, phenyl perfluorinated alkyl, perfluorinated alkoxyalkyl, perfluorinated alkoxyalkyleneoxyalkyl, and perfluorinated alkoxypoly(alkyleneoxy) alkyl.

2. Compounds according to claim 1 wherein said radicals R and R' are perfluorinated alkyl with 1 to 8 carbon atoms.

3. Compounds according to claim 1 wherein said radicals R and R' are perfluorinated alkoxyalkyl with 1 to 8 carbon atoms.

4. Compounds according to claim 1 having an ASTM slope of about 0.5 or lower.

5. Compounds according to claim 1 wherein said radicals R and R' are —$C_2F_4OC_2F_5$.

6. Compounds according to claim 1 wherein said radicals R and R' are —$CF_3$.

7. Compounds according to claim 1 wherein R' and R' are —$C_2F_4OC_2F_5$, $m/n$ is 1.55, and the number average molecular weight of said compounds is 3150.

8. Compounds according to claim 1 wherein R and R' —$CF_3$, $m/n$ is 0.6, and the number average molecular weight of said compounds is 4070.

References Cited
UNITED STATES PATENTS

| | | | |
|---|---|---|---|
| 3,542,660 | 11/1970 | Grindahl et al. | 260—248 X |
| 3,566,835 | 3/1971 | Grindhal et al. | 260—248 |
| 3,708,483 | 1/1973 | Anderson et al. | 260—248 |

JOHN M. FORD, Primary Examiner

U.S. Cl. X.R.

252—78, 63.7, 51; 260—465.6, 564

UNITED STATES PATENT OFFICE
CERTIFICATE OF CORRECTION

PATENT NO. : 3,845,051
DATED : October 29, 1974
INVENTOR(S) : Joseph La Mar Zollinger It is certified that error appears in the above-identified patent and that said Letters Patent are hereby corrected as shown below:

Column 5, line 17, the first "NH" should read -- $NH_2$ --;

Column 5, line 57, "soluvent" should read -- solvent --;

Column 6, line 65, "phenyl" should read -- phenyl, --;

Column 7, lines 8, 9, "R and R' -$CF_3$" should read -- R and R' are -$CF_3$ --;

Column 8, line 4, "Grindhal" should read -- Grindahl --.

Signed and Sealed this second Day of September 1975

[SEAL]

Attest:

RUTH C. MASON
Attesting Officer

C. MARSHALL DANN
Commissioner of Patents and Trademarks